J. E. DUKELOW.
CHAIN DRIVING BELT.
APPLICATION FILED JUNE 23, 1913.
1,313,171. Patented Aug. 12, 1919.
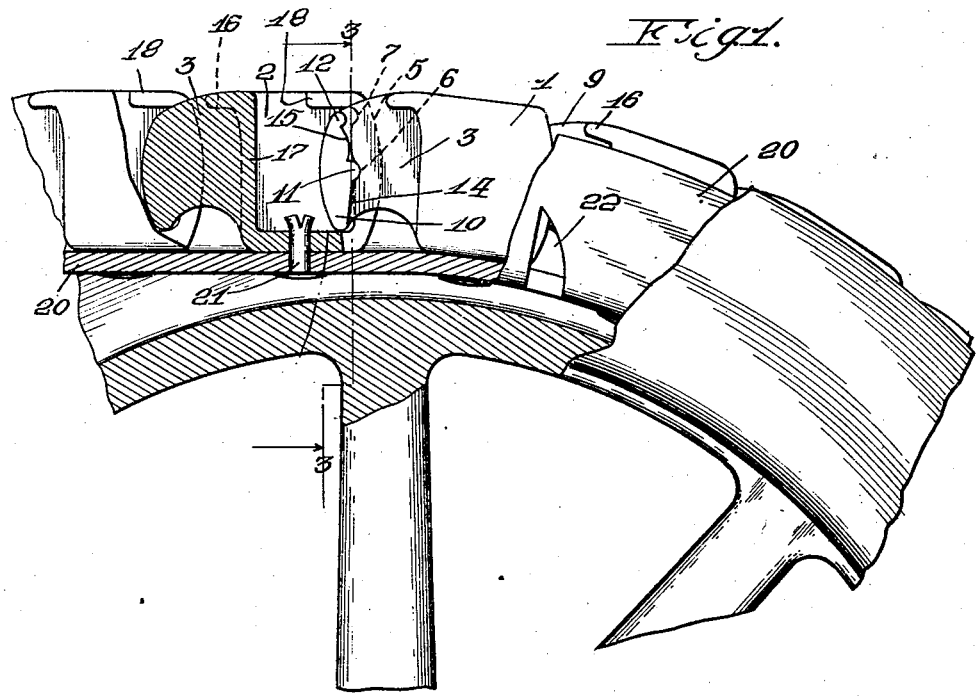
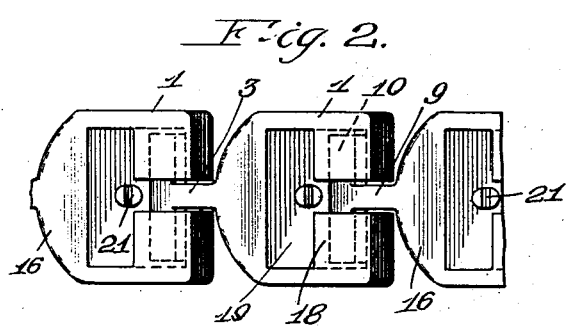
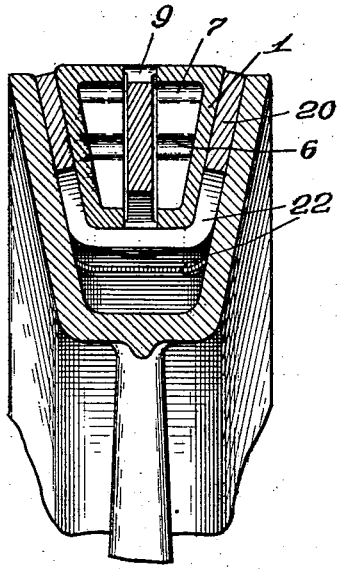
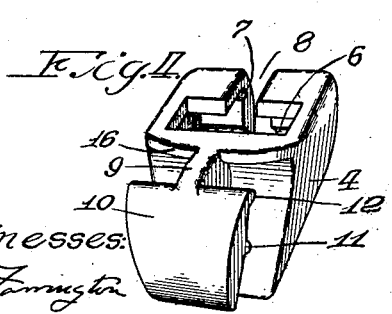
Witnesses:
R. L. Farrington
Blanche Chalmers.
Inventor
John E. Dukelow
Burton U. Hills
Atty.

UNITED STATES PATENT OFFICE.

JOHN E. DUKELOW, OF CHICAGO, ILLINOIS.

CHAIN DRIVING-BELT.

1,313,171.      Specification of Letters Patent.      Patented Aug. 12, 1919.

Application filed June 23, 1913. Serial No. 775,293.

*To all whom it may concern:*

Be it known that I, JOHN E. DUKELOW, a citizen of the United States, residing at Chicago, in the county of Cook and State of Illinois, have invented certain new and useful Improvements in Chain Driving-Belts, of which the following is a description.

My invention relates to chains for frictionally connecting a pair of sheaves for transmitting power from one shaft to another.

The object of my invention is to provide a simple, strong and durable connector of the kind described, arranged to obviate wear between the links as far as possible and produce an exceptionally substantial and durable driving member.

To this end my invention consists in the novel construction, arrangement and combination of parts herein shown and described, and more particularly pointed out in the claims.

In the accompanying drawings wherein like or similar reference characters indicate like or corresponding parts.

Figure 1 is a fragmentary view of a portion of a rim of a sheave coöperating with my improved chain, with parts removed and broken away to more clearly show the construction and relation of the several parts.

Fig. 2 is a plan view of my improved chain.

Fig. 3 is a section taken substantially on line 3—3 of Fig. 1.

Fig. 4 is a perspective detail view of a single link of my improved chain.

In the form shown in the drawings my device consists of a plurality of substantially similar links 1—1 each having a chamber 2 at one end and a projection 3 at the opposite end adapted to extend into the chamber 2 of the next adjacent link to connect the links together. As shown the chamber 2 is rectangular in form and the side walls converging inward toward the bottom of the chain or toward the sheave to correspond with the form of the groove in the sheave with which the links are arranged to coöperate. The end wall 5 of the chamber at the end of the link is arranged substantially at right angles to the center line of the chain and provided with a plurality of transverse grooves 6 and 7. The groove 6 is preferably at approximately the center of the wall 5 and the groove 7 near the upper margin of the same and are substantially parallel to each other. The end wall 5 is also provided with a vertical slot 8 dividing it into two sections of substantially the same size each rigidly attached to a side and the bottom of the link. The projection 3 is preferably T shaped having a stem or shank 9 and a head 10. The stem 9 is attached to the center portion of the wall 17 opposite the wall 5 and is adapted to extend through the slot 8. A transverse wall or head 10 is formed at the free end of the stem with its inner or bearing surface curved vertically as shown but transversely substantially at right angles to the center line of the link. A pair of ribs or projections 11 and 12 are provided upon the bearing surface of the head 10 adapted to fit in and coöperate with the grooves 6 and 7 respectively, to prevent transverse movement between the wall 5 and head 10. The several parts are so constructed and arranged that when the chain extends substantially in a straight line the lower portion 14 of the head or wall 10 rests against the lower portion of the wall 5; the ridge 11 coöperating with the groove 6 to accurately maintain the links in position. In passing over a sheave or other point where the chain is deflected the surface 15 between the ribs 11 and 12 which is preferably curved as shown engages the flat surface of the wall of the next adjacent link and as the deflection increases it gradually withdraws the rib 11 from the groove 6 and moves the rib 12 into engagement with the groove 7 thus constantly holding the bearing surfaces against slipping transversely of the ribs and grooves. The several parts are so constructed that when the links are deflected as in the ordinary movements of the chain the surfaces of the wall 5 and head 10 will roll upon each other without sliding, thereby avoiding friction and the consequent wear between the surfaces. In the preferred construction suitable flanges 16 extend from the wall 17 of the chamber to the stem 9 to strengthen the same, and projections 18 extend from the upper margin of the wall 5 to the side walls of the chamber to strengthen the same and to partially close the opening into the chamber to exclude grit or other foreign material. The several parts however are so constructed that the head 10 may be passed through the opening 19 in the top of the chamber for connecting or disconnecting the links. Where it is desired to avoid metallic contact between the chain and the sheaves with which it co-operates, a cushion 20 formed of leather, canvas or other suitable resilient material may be provided of suitable width to cover the side walls of the links and extend across their bottom and suitable rivets 21 or other convenient means are provided to attach the cushion to the bottom wall of the chamber to hold the cushion in position and where it is desired to operate the chain upon sheaves of comparatively small diameter suitable openings 22 may be provided in the cushion to increase its flexibility.

Having thus described my improvements it is obvious that various immaterial modifications may be made in my device without departing from the spirit of my invention, hence, I do not wish to be understood as limiting myself to the exact form or construction shown.

What I claim as new and desire to secure by Letters Patent is:

1. A chain comprising a plurality of links each having a chamber at one end and a projection at the opposite end adapted to enter the chamber of the next adjacent link, the end wall of said chamber and of said projection being each provided with a substantially flat bearing surface adapted to coöperate with a flat bearing surface upon the next adjacent link to connect said links together, said bearing surfaces having a depression at one margin thereof adapted to coöperate with a projection at one margin of a bearing surface of the next adjacent link to prevent the displacement of said latter bearing surfaces upon each other.

2. A chain comprising a plurality of links each provided with a socket having a flat bearing surface at one end thereof and a head provided with a curved bearing surface at the opposite end, said head adapted to enter the socket of the next adjacent link, the curved bearing surface of each head adapted to coöperate with the bearing surface within the socket of the adjacent link when the links are connected together.

3. A chain comprising a plurality of links each having a chamber at one end and a T shaped projection at the opposite end, the end wall of said chamber provided with a flat bearing surface and the T shaped projection provided with a curved bearing surface, said surfaces adapted to coöperate with each other when the T shaped projection is inserted into the chamber of the adjacent link to connect the links together.

4. A chain comprising a plurality of connected links each provided with a flat bearing surface at one end thereof and a curved bearing surface at the opposite end, the flat bearing surface of each link adapted to coöperate with the curved bearing surface of the adjacent link when the links are connected together.

5. A chain comprising a plurality of connected links each provided with a flat bearing surface at one end thereof and a curved bearing surface at the opposite end, the flat bearing surface of each link adapted to coöperate with the curved bearing surface of the adjacent link when the links are connected together and means for preventing the transverse movement of said bearing surfaces upon each other.

6. A chain comprising a plurality of connected links, each provided with a flat bearing surface at one end thereof and a curved bearing surface at the opposite end, the flat bearing surface of each link adapted to coöperate with the curved bearing surface of the adjacent link when the links are connected together and means at one margin of said bearing surfaces for preventing the transverse movement of said bearing surfaces upon each other.

7. A chain comprising a plurality of connected links each provided with a flat bearing surface at one end thereof and a curved bearing surface at the opposite end, the flat bearing surface of each link adapted to coöperate with the curved bearing surface of the adjacent link when the links are connected together, one bearing surface having a depression at one margin thereof adapted to coöperate with a projection at one margin of the opposite bearing surface, said depression and projection being adapted to prevent the displacement of said bearing surfaces upon each other.

8. A chain comprising a plurality of detachable links each provided with a socket having a flat bearing surface at one end thereof and a head provided with a curved bearing surface at the opposite end, said head adapted to enter the socket of the next adjacent link, the curved bearing surface of each head adapted to coöperate with the bearing surface within the socket of the adjacent link when the links are connected together.

9. A chain comprising a plurality of detachable links each having a chamber at one end and a T shaped projection at the opposite end, the end wall of said chamber being divided centrally and provided with a plurality of flat bearing surfaces, and the projection being centrally divided to provide a plurality of bearing surfaces the latter surfaces being curved and adapted to coöperate with the flat bearing surfaces within the chamber when the T shaped projection is inserted in the chamber of the next adjacent link.

10. A chain comprising a plurality of detachable links each having a chamber at one end and a T shaped projection at the opposite end, the end wall of said chamber being divided centrally and provided with a plurality of flat bearing surfaces, and the projection being centrally divided to provide a plurality of bearing surfaces, the latter surfaces being curved and adapted to coöperate with the flat bearing surfaces within the chamber when the T shaped projection is inserted in the chamber of the next adjacent link and means for preventing the displacement of said bearing surface upon each other.

In testimony whereof, I have hereunto signed my name in the presence of two subscribing witnesses.

JOHN E. DUKELOW.

Witnesses:
BLANCHE CHALMERS,
BURTON U. HILLS.